May 5, 1970     P. J. CHEYSSON     3,510,006
GRAVITY SEPARATION OF IMMISCIBLE LIQUIDS
Filed Feb. 2, 1968     3 Sheets-Sheet 1

May 5, 1970      P. J. CHEYSSON      3,510,006

GRAVITY SEPARATION OF IMMISCIBLE LIQUIDS

Filed Feb. 2, 1968      3 Sheets-Sheet 3

3,510,006
GRAVITY SEPARATION OF IMMISCIBLE LIQUIDS
Philippe J. Cheysson, Sainte Adresse, France, assignor to Esso Research and Engineering Company, a corporation of Delaware
Filed Feb. 2, 1968, Ser. No. 702,620
Claims priority, application France, Feb. 7, 1967, 93,991
Int. Cl. B01d 17/02
U.S. Cl. 210—522
11 Claims

ABSTRACT OF THE DISCLOSURE

A separator comprising an inner jacket inside the separator and a plurality of separation stages spaced above each other inside the jacket wherein each stage has a tray and a peripheral diffuser.

---

The present application is concerned with the gravity separation of liquids of different densities, e.g. water and hydrocarbons, with semi-automatic control of operation.

According to this invention the separator comprises an inner jacket inside the separator and spaced from the sides and bottom of the outer wall of the separator, a plurality of separation stages spaced above each other inside the inner jacket, wherein each stage has (1) a tray shaped so that the surface thereof slopes downwards in an inwards direction, each tray having an aperture in the lower region thereof, and (2) a peripheral diffuser through which liquid can pass when entering the separation stage from the space between the inner jacket and the outer wall of the separator; and wherein the space between the outer wall of the separator and the inner jacket extends upwards into an upper chamber provided with an outlet for separated liquid.

In a preferred embodiment such separators are cylindrical and have inside $n$ superimposed separating stages each having a tank in the form of a truncated cone on a level with which opens a peripheral diffuser causing the corresponding stage to communicate with an annular chamber provided between the tank and an intermediate partition, this annular chamber having radial blades which are indented on the one hand to occupy on the inside the space allowed between the partition and the superimposed tank, and on the other hand to bound, at the end of a portion in the form of a reversed L, a vertical blade whose terminal point extends to the vicinity of the intermediate partition of the upper stage.

The improvements according to the present invention are aimed at simplifying the design of the separator and at considerably reducing its vertical bulk, while contributing to increase its separating properties.

These improvements relate in particular to the means adopted, on the one hand, for increasing the treatment capacity per hour and on the other for reducing inside the separator the rate of passage of the mixture to be purified to improve considerably the effect of separation by gravity and by dispersion, but without interfering with the phenomena of capillary ascent.

Preferably the different superimposed stages of separation of the separator are delimited inside a self-contained inner jacket, fitted, wedged and centered inside the outer wall of the separator to form with the latter an outer chamber forming a balancing column ending in a bottom tank provided between the bottom of the jacket and the tank and extending to an upper chamber divided by two partitions for the discharge of liquids, e.g. water and hydrocarbons respectively, into two pre-separation zones each incorporating at least one group of collecting and anti-roll vertical plates. The lighter liquid, e.g. hydrocarbon, is preferably channeled through a spout and into the respective outlet.

The inner jacket usually has a curved bottom and preferably has attached thereto a skirt to act as an anti-roll device. This is particularly desirable when the separator is used on board ship. This skirt depends from the inner jacket into the space below, i.e. between the bottom of the inner jacket and the outer wall of the separator. In order to allow liquid (e.g. hydrocarbon), which separates and becomes trapped under the bottom of the inner jacket to rise further the skirt is preferably interrupted at various places.

The inlet feed for the mixture of liquids preferably communicates with the upper chamber. In the upper chamber there is preferably at least one group of substantially parallel and vertically disposed plates which serve as anti-roll plates and also assist the separation of the liquids. With a cylindrical separator the plates are usually arranged to be substantially concentric with respect to the axis of the separator. Each plate can be substantially triangular with a convex hypotenuse orientated downstream with respect to the flow of liquid, said hypotenuse together with a concave edge forming an apex, each of said apices being offset upstream with respect to each other. The upper edges of the plates should preferably extend to a higher level than that of the partitions in the upper chamber.

In order to provide a convenient outlet for the heavier liquid, e.g. water, the periphery of the uppermost tray, (preferably funnel shaped), should be surrounded by a gutter or channel for collecting liquid, the channel communicating with a discharge outlet.

The peripheral diffusers usually comprise inwards directed vanes and the lowermost set thereof can be U-shaped and project upwards inside the inner jacket and in the space between the inner jacket and the outer wall of the separator, thereby acting as centering guides for the inner jacket. The vanes preferably terminate upwards in a point close to the underside of a tray.

Various other characteristics of the invention will moreover emerge from the detailed description that follows.

One form of the invention is shown by way of non-restrictive example, in the attached drawings.

Figure 2:
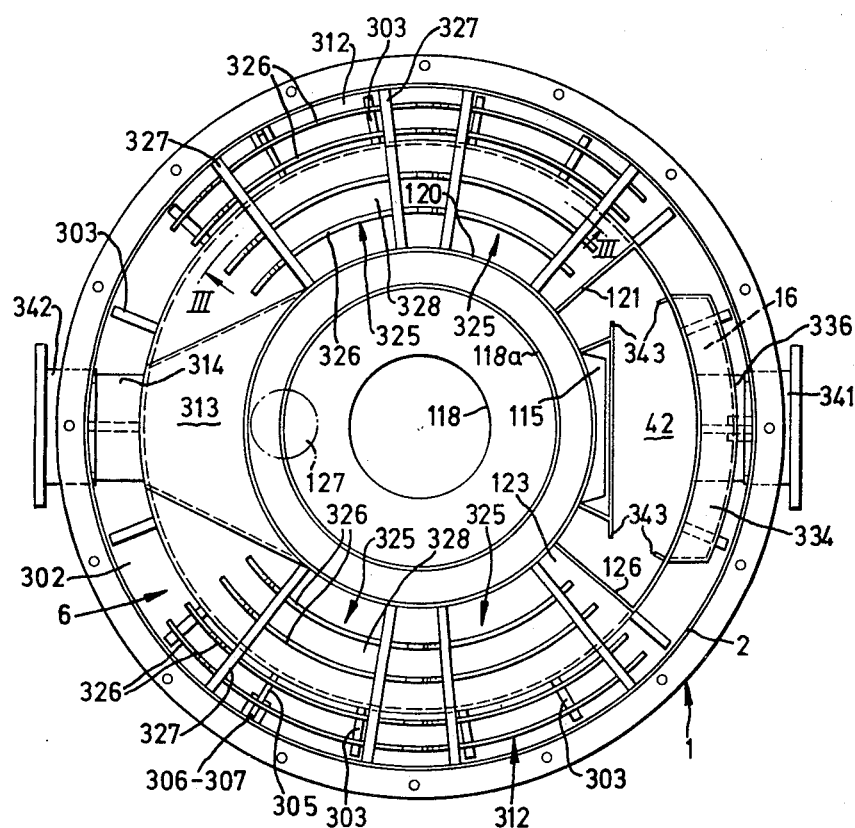
FIG. 2 is a plan view very largely along the line II—II of FIG. 1.

The separator consists of a cylindrical tank with vertical axis formed by a jacket 2 fitted with a bottom 3, either curved or in the form of a truncated cone, connected at the centre by a pipe 3a, to an outer valve 4. The jacket 2 bounds a balancing column 6, parallel to the axis of the separator, ending substantially in the middle of a container 15 provided between the bottom 3 and an intermediate partition 19 in the form of a truncated cone. This container, which constitutes the first stage of separation, is joined at its upper level with a pipe 16 ending in the top part of the separator. The intermediate partition 19 is prolonged from its small base by a funnel 20 causing the stage 15 to communicate with an annular-shaped chamber 21 provided between the partition 19 and a tank 22 in the form of a truncated cone forming a second stage of separation 26. This stage is blocked at its upper part by an intermediate partition 37 which is likewise in the form of a truncated cone but inverted compared with the tank 22. The intermediate partition 37 has in its central portion a funnel 118 ending in the middle zone of the stage 26. The orifice of the funnel 118, on a level with the partition 37, is bordered by an overflow 118a which opens in the centre of a transfer chamber 119 bounded by a wall 120 rising from the said partition 37.

As will be apparent from FIG. 2, the wall 120 is associated with two outer radial separators 121 and 126 which isolate an overflow spout 42 in which end the pipe 16 and a header 115 bounded at the upper part of the stage 26 by the intermediate partition 37 and the wall 120. The radial separators 121 and 126 traverse an annular shaped passage 123 delimited between the convex side of the wall 120 and the portion corresponding to the jacket 2. This passage 123 communicates with a directly superimposed supply pipe or tube 127 for the mixture.

Each stage 15 and 26 has a peripheral diffuser 14 and 25 consisting mainly of a peripheral flanged edge 12 and 23 extending in a plane below an annular deflector 13 and 24. The diffusers 14 and 25 are designed to subject the mixture entering the stages 15 and 26 to a dispersion which tends to create through gravity, the separation of the water and hydrocarbons. For this purpose the diffusers 14 and 25 have vertical blades 200 of indented shape designed to be arranged radially between the flanged edges 12 and 23 and the annular deflectors 13 and 24 so as to occupy entirely the whole of the space allowed between the latter in order to avoid any disturbing current that might be detrimental to the laminar flow that has to be maintained in the stages 15 and 26. Every blade 200 has a section 201 in the form of an inverted L extended by a blade 202 rather like the shape of a harpoon. This part 202 extends vertically inside the stage superimposed on the corresponding deflector so that the point 203 is arranged as close as possible to the intermediate partition 19 or 37.

The separating stages 15 and 26 are bounded, by the means described above, inside a cylindrical tank 300, which is concentric with and inside the jacket 2. The tank 300 is entirely closed at its upper level by the intermediate partition 37 and at its lower level by a curved bottom 301 which may nevertheless be in the shape of a truncated cone, like the base 3 of the jacket 2. The curved bottom 301 of the tank 300 in fact constitutes the lower part of the separating stage 15.

The outer diameter of the tank 300 is selected so as to be very much less than the inner diameter of the jacket 2, so as to bound with the latter a vertical annular chamber 302 forming the balancing column 6 and extending to the extent of passage 123. The constant partitioning of the width of the annular chamber 302 is ensured more especially by the vanes or blades 200 belonging to the peripheral diffuser 14 of the lower stage 15. For this purpose the blades 200 are designed very largely in the shape of a U to comprise, parallel to the blade 202, a second blade 303 extended by a point 304, whose special function appears in what follows. The blades 303 extend radially in the ring-shaped chamber 302 to form what is very largely a peripheral object ribbed and outside the tank 300 and capable of ensuring its partial centering in the jacket 2. To assist the assembly of the tank 300 in the casing 2, the blades have a width that is slightly less than that of the chamber 302 and moreover, some of these blades 303, which are selected so as to be equidistant angularly, form at their bottom part a heel 305. Each heel 305 is provided with means for acting in conjunction with a gliding guide 306 rising from a stop 307 forming one part with the internal peripheral wall of the jacket 2. The height of the stops 307 is determined to ensure the axial securing of the tank 300 in relation to the jacket 2 so as to provide between the bottom 3 and the curved bottom 301 a lower container 308 whose height corresponds substantially with the width of the annular-shaped chamber 302. The lower container 308 thus forms an intercommunicating tank between the different radial zones of the annular-shaped chamber 302 making it possible to establish a distribution and a balance of the rates of descent of the mixture delivered by the supply pipe or tube 127. This container 308 is thus normally always filled with the mixture to be treated.

In the special application where the separator which is described above is installed on board a ship, it will be understood that the mass of liquid permanently maintained in the container 308 entails the risk of being subjected, through the effect of roll, to internal movements or shifts that can cause a considerable variation in the upper level of the annular chamber 302. To prevent such variations from interfering with the normal operation of the separator, the curved bottom 301 is associated with an anti-roll skirt 309 formed outside to partition the zone of the said curved bottom 301 and of the container 300. This skirt 309 can be formed in any suitable way, in particular by a hoop attached by welding or by an extension of the peripheral wall of the tank 300.

Figure 1:
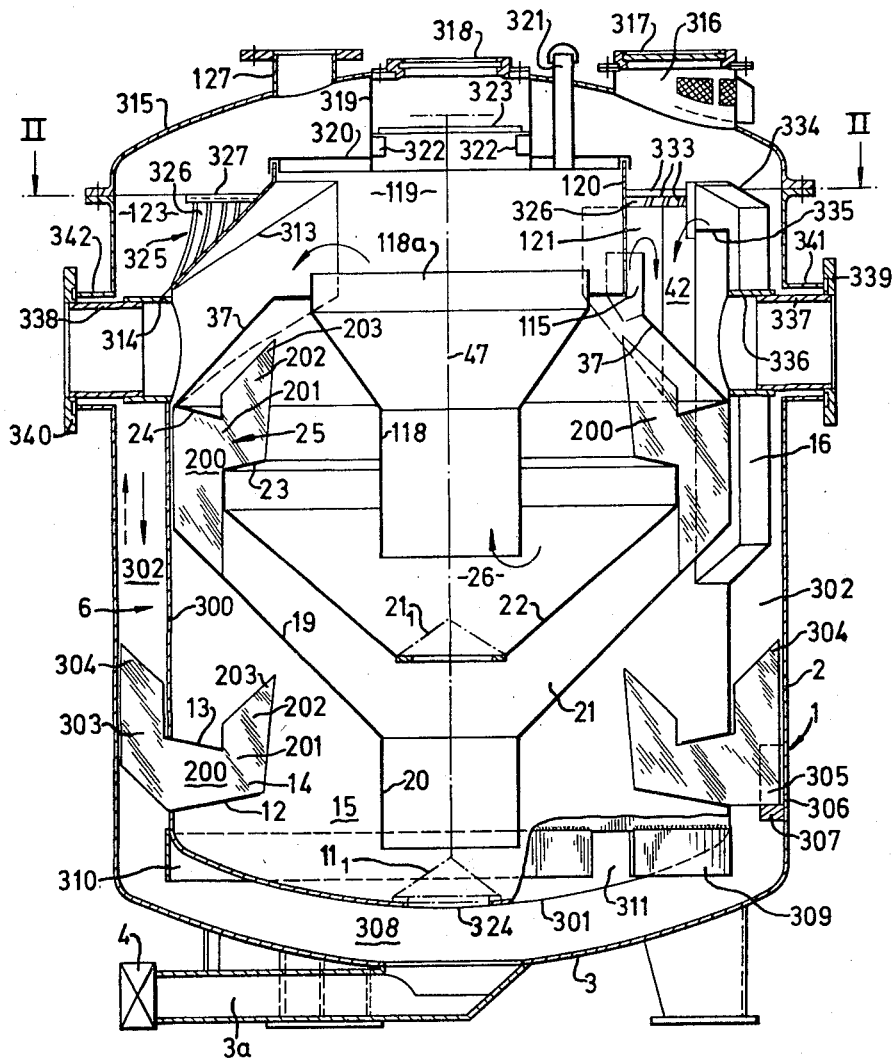
FIG. 1 is a vertical elevation section of the separator according to the invention.

As can be seen in FIG. 1, the skirt 309 bounds with the bottom 301 of the tank 300 a parasitical peripheral one 310 in which liquid hydrocarbons, separated by gravity, can accumulate. For this purpose the skirt 309 has at certain points windows 311 made up to the level of the peripheral wall of the tank 300 to ensure, by a difference in density, the discharge and rise of the hydrocarbons separated in the annular chamber 302.

The passage 123 is divided into two sections 312 very largely of the same extent by a tubular sleeve in the form of a truncated cone 313 extending from the wall 120 on a plane diametrically opposed to the overflow spout 42. The sleeve 313 constitutes a discharge header causing the chamber 119 to communicate with an outlet sleeve 314 extending radially and externally from the tank 300. The sleeve 313 also constitutes by its convex surface a deflector capable of ensuring the distribution of the mixture to be treated in the sections 312 of the passage 123. For this purpose the inlet pipe 127 is initially provided to terminate on a level with the coupling zone of the sleeve 313 and the wall 120, while being supported by a removable lid 315 closing the upper part of the jacket 2. Besides the tube 127, the lid 315 also supports, on a diametrically opposite plane a ventilating nozzle 316 which is advantageously fitted with a window or opening 317. A second window or opening 318 is also provided in the centre of the cover 315 in the extension of an internal sleeve or bush 319 supporting a cap 320 designed to encase the wall 120 to close the transfer chamber 119. The cap 320 is traversed by a vent tube 321 ending outside the cover 315 to prevent the chamber 119 from being subjected to an inner pressure or vacuum. Brackets or angle blocks 322 are formed inside the bushing 319 to support a centering plate 323 for supporting a set of rods 47 for controlling the opening or the closing of valves 21, and 11, closing respectively the small base of the tank 22 and a central opening 324 in the curved bottom 301.

Each section 312 of the passage 123 contains two anti-roll groups and headers 325 arranged without direct contact, but in the prolongation of one another to extend very largely throughout the angular space between the sleeve 313 and the corresponding radial separator 121 or 126. Each group 325 consists of a certain number of curved plates 326, for instance four in number, placed vertically in the section 312 and concentrically relative to the axis of the separator. These different plates 326 are maintained parallel to one another, but without surface contact, by supporting bars 327 arranged to be suspended between the wall 120 and the jacket 2. Each section 312 is thus divided into a certain number of parallel veins 328 which are isolated from one another at least in part by the vertical partitions provided by the different plates 326.

Figure 3:
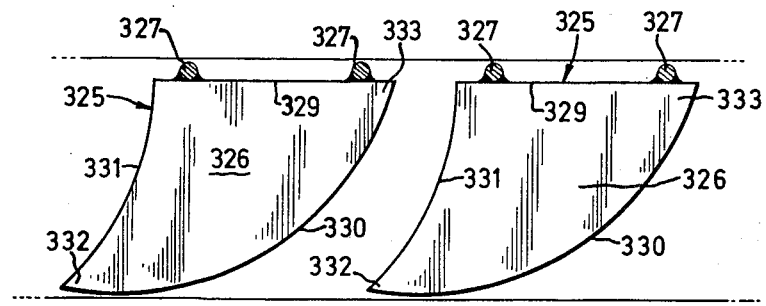
FIG. 3 is a developed partial section showing more in detail certain of the constituent parts forming the separator according to the invention.

As is apparent from FIG. 3, each plate 326 takes the form of a triangle whose small base 329 is fixed to bars 327. The shape of each plate 326, taking into account its radial distance relative to the axis of the separator, is designed to present a hypotenuse that is convex, and a third concave side 331. The radius of curvature of this side 331 is selected so that the lower apex 332 is shifted outside in relation to the angle defined between the said side 331 and the base 329. The height of the triangle thus bounded is moreover determined according to the relative position of each plate 326 so that the top 332 extended close to the truncated cone portion of the intermediate partition 37.

The formation of the groups 325 is likewise devised so that when they are placed in position in the sections 312, the convex edges 330 of the different plates 326 are orientated downstream in relation to the direction of flow of the liquid between the distribution sleeve 313 and the radial partitions 121 and 126. Moreover, the space allowed between the two groups of the same section 312 is selected to obtain, by superimposition of the plane, a certain overlap of the tips 332 of the plates 326 of the down-stream group by the angles 333 defined by the 330 and 329 of the plates 326 of the upstream group.

Figure 4:
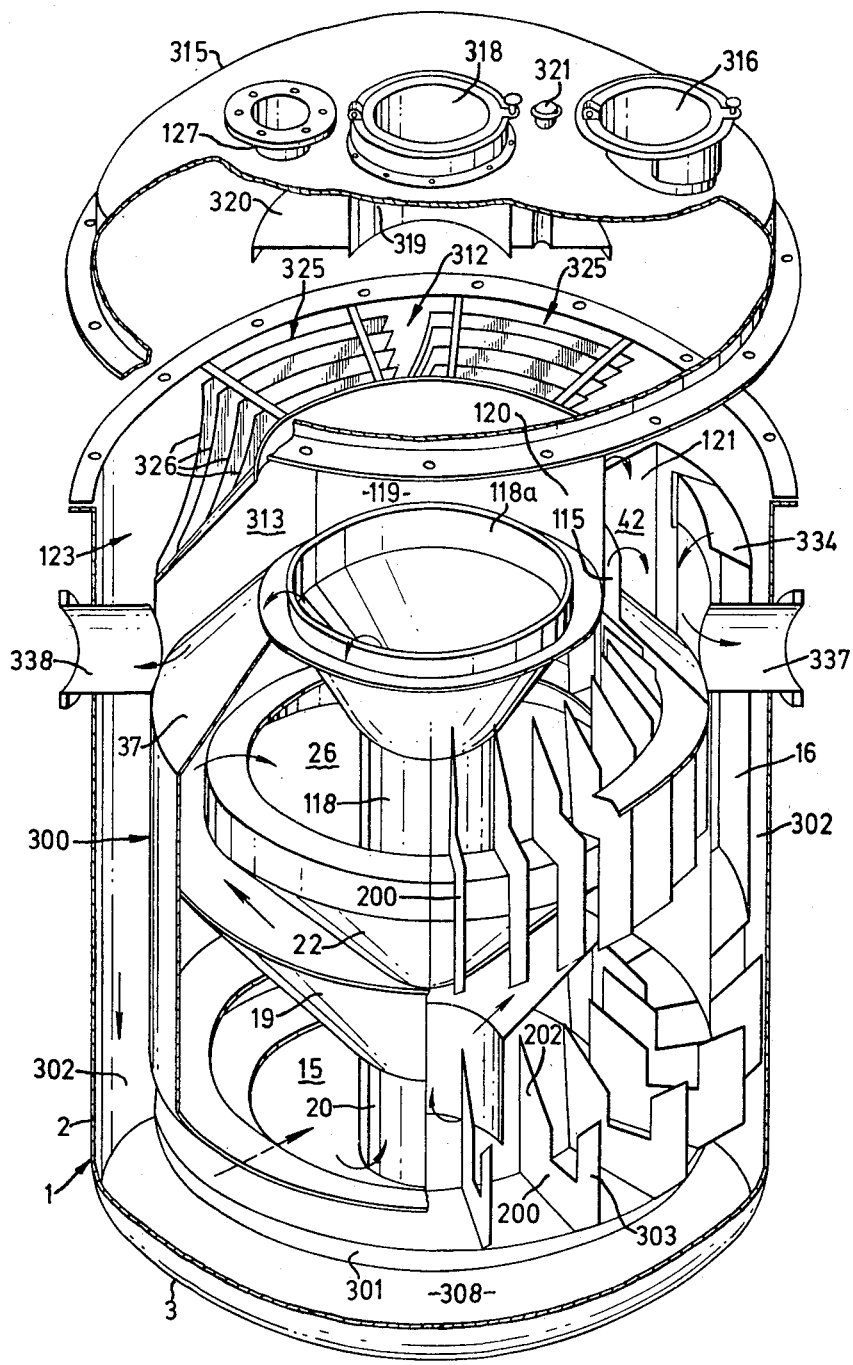
FIG. 4 is an exploded diagrammatic view showing the separator on a slightly smaller scale.

As is apparent from FIGS. 1 and 4, the angles 333 of the plates 326 of each group 325 upstream extend in a plane above the edge corresponding to the radial separators 121 and 126 whose height is determined to establish a level of communication, which may be adjustable, between the two sections 312 and the overflow spout 42. This level is obviously higher than that of the overflow 118 so that in no case, by the very principle of communicating vessels can the level of water in the annular chamber 302 and more especially in the sections 312 of the passage 123, attain that of the said radial separators 121 and 126 and of the corresponding portion of the peripheral wall of the tank 300. For the same purpose the pipe 16, which extends in part inside the chamber 302, is extended by a hood 334 superimposed on a curved edge 335 formed on the upper part of the corresponding part of the peripheral wall of the tank 300. The latter also supports, in the bottom part of the overflow spout 42 and on a plane diametrically opposite the outlet sleeve 314, an inner sleeve 336 on which there is fitted a lining 337 passing through the jacket 2 to form a tube for discharging hydrocarbons. This lining 337 is very largely identical with a lining 338 extending the outlet sleeve 314 to form the outlet tube for the purified water. The linings 337 and 338, for instance, which are screwed to form a tight fit on the sleeves 336 and 314, form one part with the connecting flanges 339 and 340, which are intended to be used with seal on the outer sleeves 341 and 342 which form one part with the jacket 2.

The separator which is described above operates in the following manner.

The mixture to be purified and delivered by the intake pipe 127 is distributed by the sleeve 313 to the sections 312 of the passage 123. The mixture then occupies directly the annular chamber 302 whose total effective area is chosen so as to maintain a low rate of descent, even in the case of the maximum delivery produced by the tube 127. In the connecting zone of the passage 123 and the chamber 302, the mixture to be purified is in this way subjected to a deceleration which furthers the creation in the said chamber 302 of natural rising counter-flow streams of particles of hydrocarbons separated by gravity and collected by surface tension along the walls of the jacket 2 and the tank 300. The particles separated within the annular chamber 302 thus have a tendency to accumulate on a higher level than the passage 123 and the sections 312. The groups 325 of these sections 312 contribute, by forced channeling to the radial separators 121 and 126, to restoring a system of calm flow of the separated hydrocarbons which are subjected, on either side of the sleeve 313, to intense turbulence owing to the descent of the mixture delivered by the tube 127. This furthers the accumulation in the upper part of the passage 123 of a layer of hydrocarbons separated by gravity and by the action of the plates 326. Indeed, the hydrocarbons suspended in the lower part of the sections 312 are collected by surface tension by the different plates 326, after which they are passed by capillary attraction along the convex edges 330 to the level of the upper accumulated layer. The groups 325 thus contribute to providing the preseparation of the mixture before the latter enters the annular chamber 302. Moreover, the plates 326 also contribute to channelling the particles of accumulated hydrocarbons to the upper part of the sections 312 in order to direct them afterwards to the overflow spout 42. Indeed, when the upper accumulated layer reaches the level of the radial separators 121 and 126, the separated hydrocarbons automatically flow into the spout 42 after which they enter the inner sleeve 336 and the lining 337 leading to the discharge pipe.

Besides the function of preseparation, it must be pointed out that the groups 325 are also provided to offer opposition to any movement of the liquid mass contained in the passage 123, for instance through the effect of rolling in the event of the separator being on board a vessel. Indeed, the plates 326 form an internal partition offering opposition to all movement of the liquid mass which is compulsorily channeled and kept in the streams 328. This makes it possible, in addition to the action of the skirt 309, to reduce to an acceptable value the variations of the upper level of the separator to avoid any chance of overflow of water into the spout 42.

In spite of the presence of the anti-roll skirt 309 and the groups 325, it is certain that eddies can nevertheless occur on the level of the layer of hydrocarbons accumulated in the passage 123. To prevent such eddies from entailing the splashing of hydrocarbons by counterflow in the header 115 or the pipe 16, the inner wall of the tank 300 and the corresponding part of the intermediate partition 37 comprise deflectors 343 forming partial screen relative to the overflow orifices of the header and the pipe.

As will be apparent from what has already been said, the mixture to be treated undergoes during its passage in the part 123 and in the annular chamber 302 a very considerable separation making it possible to recover the greater part of the hydrocarbons which it contains. When the mixture, in part purified, reaches in the annular chamber 302 the level of the peripheral diffuser 14 the presence of blades 303 of the vanes 200 causes the separation of the hydrocarbons that are still suspended. These separated hydrocarbons are collected by surface tension after which they are passed by capillary attraction and by counterflow to the points 304, then taken over by the inner wall of the jacket 2. It follows that the mixture contains, after it has passed through the diffuser 14, a relatively small content of hydrocarbons.

In the course of its journey through the peripheral diffuser 14, the mixture is divided into laminar streams by radial vanes 200 on either side of which the said mixture is caused to unload the hydrocarbons in suspension. These vanes 200 are designed to subject the mixture to a very considerable surface contact so as to collect by surface tension the suspended particles which then, through the effect of capillary attraction and by the movement due to the stream of mixture, are collected towards the points 203. The arrangement of the latter inside the stage 15 is selected so that the stream of mixture in course of separation in the said stage tends to detach the particles collected to project them on the lower surface of the intermediate partition 19. The film thus formed is eliminated, through capillary action and difference of density, to the discharge pipe 16 ending in the overflow spout 42.

The mixture then flows through the funnel 20 and follows the annular chamber 21 in which it is subjected by the vanes 200 to a second separation of the residual hydrocarbons which are likewise collected by surface tension, in particular after passing at right angles to the diffuser 25, to accumulate on the upper level of the intermediate partition 37, then discharged by the header 115 into the overflow spout 42. Beyond the stage 26, the purified water flows through the funnel 118, then the overflow 119a, to be discharged by the transfer chamber 119 and the sleeve 313.

As is apparent from the foregoing, the greater part of the particles of hydrocarbons are separated on a level with the passage 123 and the chamber 302, which constitute an effective stage of pre-separation. This makes it possible to provide only two superimposed stages in the tank 300 and therefore to reduce the vertical bulk of the separator without lessening its treatment capacity. Moreover, the arrangement of the balancing column 6 formed by the annular chamber 302 makes it possible to reduce very considerably the rate of flow and passage of the mixture inside the separator, but without curbing the inlet delivery of the mixture to be treated and the outlet delivery of purified water. For a given maximum feed delivery, the separator is thus able to operate with a largely constant delivery without causing any considerable loss of pressure of a disturbing nature in the circuits above and below which it is connected.

The particular arrangement that has been described above is also advantageously provided for simplifying the design and furthering the production of the separator. Indeed, and this is a particular feature of the invention, the main part of the separator proper can easily be placed in or removed from the jacket 2 after removing the cover 315. The fitting in position of the self-contained part formed by the tank 300 moreover does not entail any particularly delicate operation, since supporting and centering are ensured automatically by the slides 306 and the stops 307 in conjunction with which act the heels 305 of the vanes 200. Such as arrangement also makes it possible to make the container 1 the form of a jacket 2 of self-contained type on which there are attached initially the outer sleeves 341 and 342. It is thus possible to adapt directly the linings 337 and 338 which can be screwed to the inner sleeve 336 and 314 which are made in one part with the tank 300.

The particular design of the separator moreover makes it possible to reduce also the frequency of the maintenance operations. Indeed, the sediments which can be incorporated with the mixture to be treated are automatically separated by gravity in the chamber 302 and accumulated in the container 308 from which they can be discharged through the pipe 3a. It follows that the mixture passing through the stages 15 and 26 is practically free from sediment, the accumulation of which on the bottom 3 and the tank 22 is very slight.

The invention is not confined to the practical example represented and described in detail for different modifications can be made to it without departing from its scope.

What is claimed is:

1. A separator suitable for separating a mixture of immiscible liquids of different densities comprising an outer housing, an inner jacket disposed inside said outer housing, defining an annular shaped chamber between said inner jacket and said outer housing, said chamber in communication with an inlet for a mixture of immiscible liquids of different density, a plurality of separation stages disposed vertically above each other inside said inner jacket, each of said stages defined by a downward sloped tray with an aperture at the center thereof in the lower region of said tray, each stage further defined by a plurality of vanes extending from said annular chamber to the inside of said jacket wherein said vanes project upward whereby said mixture enters said separation stage from said annular chamber, an upper chamber communicating with said annular chamber, an outlet for separated liquid from said upper chamber, and a plurity of parallel and vertically disposed plates housed in said upper chamber.

2. A separator as claimed in claim 1 wherein a skirt is attached to the bottom of the inner jacket and said skirt extends into said annular spaced chamber.

3. A separator as claimed in claim 1 wherein the bottom of the inner jacket is curved.

4. A separator as claimed in claim 2 wherein the skirt is interrupted so as to allow separated liquid accumulating under the bottom of the inner jacket to rise above the skirt.

5. A separator as claimed in claim 1 which comprises a spout in the upper chamber, and wherein the upper chamber is divided by two partitions to channel liquid through the spout into the outlet.

6. A separator as claimed in claim 1 which is cylindrical and wherein the plates are arranged substantially concentric with respect to the axis of the separator.

7. A separator as claimed in claim 6 wherein each plate is substantially triangular with a convex hypotenuse orientated downstream with respect to the flop of liquid said hypotenuse together with a concave edge forming an apex, each of said apices being offset upstream with respect to each other.

8. A separator as claimed in claim 1 wherein the upper edges of the plates extend to a higher level than that of the partitions in the upper chamber.

9. A separator as claimed in claim 1 which comprises a channel for collecting liquid surrounding the periphery of the uppermost tray and a discharge outlet communicating with said channel.

10. A separator as claimed in claim 1 wherein the lowermost set of vanes are U-shaped and project upwards in said annular chamber thereby acting as centering guides for the inner jacket.

11. A separator as claimed in claim 1 wherein the vanes terminate upwards in a point close to the underside of a tray.

References Cited

UNITED STATES PATENTS

| | | | |
|---|---|---|---|
| 1,020,013 | 3/1912 | Arbuckle | 210—521 |
| 1,920,468 | 8/1933 | Jones | 210—521 X |
| 2,126,596 | 8/1938 | Wood | 210—539 X |
| 2,443,686 | 6/1948 | Malmgren | 210—522 X |
| 2,777,581 | 1/1957 | Unthank | 210—539 X |
| 2,793,186 | 5/1957 | Nunnel et al. | 210—521 |

J. ADEE, Primary Examiner

U.S. Cl. X.R.

210—540